United States Patent [19]
Kinosz

[11] 3,965,249
[45] June 22, 1976

[54] ANTI-POLLUTION METHOD
[75] Inventor: Donald L. Kinosz, Lower Burrell, Pa.
[73] Assignee: Aluminum Company of America, Pittsburgh, Pa.
[22] Filed: Jan. 20, 1975
[21] Appl. No.: 542,109

Related U.S. Application Data
[63] Continuation-in-part of Ser. No. 469,819, May 14, 1974, abandoned, and a continuation-in-part of Ser. No. 290,223, Sept. 18, 1972, abandoned.

[52] U.S. Cl. .............................. 423/497; 210/59; 55/71; 423/499
[51] Int. Cl.² .................................... C01B 11/06
[58] Field of Search ............... 210/62, 63, 59, 188, 210/52, 320; 55/71; 423/579, 473, 474, 240, 241, 497, 499, 498

[56] References Cited
UNITED STATES PATENTS

| | | | |
|---|---|---|---|
| 1,153,502 | 9/1915 | Kriegsheim | 423/579 |
| 1,197,640 | 9/1916 | Kriegsheim | 210/62 |
| 3,199,949 | 8/1965 | Clerbois et al. | 423/473 |

FOREIGN PATENTS OR APPLICATIONS
311,867  8/1971  U.S.S.R.

Primary Examiner—Charles N. Hart
Assistant Examiner—Bendit Castel
Attorney, Agent, or Firm—John P. Taylor

[57] ABSTRACT

Use of Co, Ni, Cu or Ca catalyst to decompose hypochlorite contained in the product resulting from scrubbing of chlorine-containing gas.

5 Claims, 1 Drawing Figure

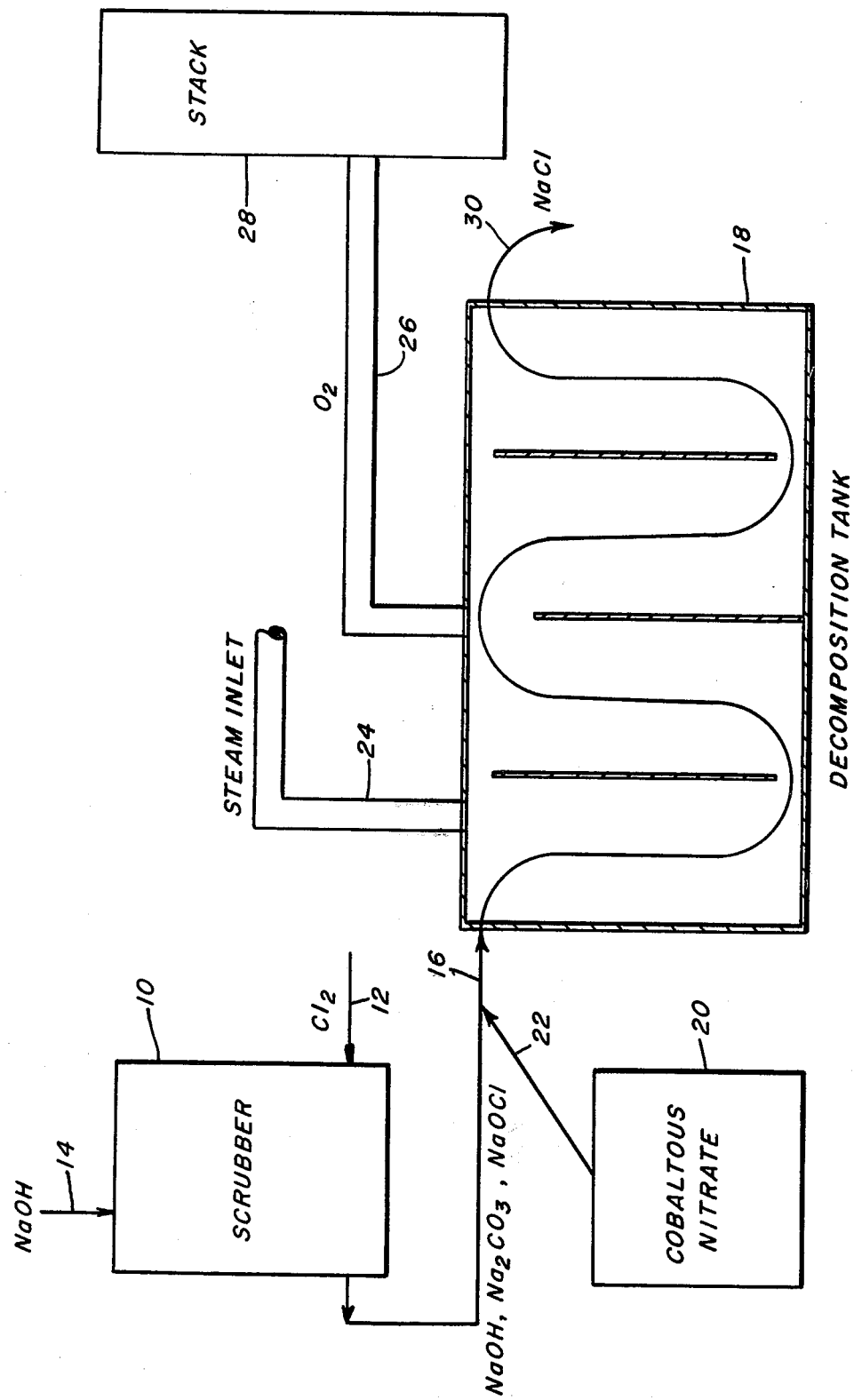

ANTI-POLLUTION METHOD

CROSS-REFERENCE TO RELATED APPLICATIONS

This application is a continuation-in-part of my prior patent application Ser. No. 469,819, filed May 14, 1974 as a continuation-in-part of my prior patent application Ser. No. 290,223, filed Sept. 18, 1972 and both now abandoned.

BACKGROUND OF THE INVENTION

1. Field of the Invention

This invention relates to scrubbing of chlorine. More particularly, it relates to catalytic decomposition of hypochlorite formed by scrubbing of chlorine-containing gas.

2. Description of the Prior Art

Scrubbing of chlorine-containing gases with alkali or alkaline earth metal hydroxide solution eliminates discharge to the atmosphere of most of the chlorine. However, the principal product of such scrubbing, hypochlorite, is often present in sufficiently high concentration to contaminate or pollute and create an objectionable odor in the streams or ponds of water receiving it.

It has previously been proposed to decompose such hypochlorites by exposing them to metal oxides such as the oxides of cobalt, copper, nickel or the like.

Kriegsheim U.S. Pat. No. 1,153,502 suggests, however, that the speed and completeness of the action depends very materially on the physical form of the oxide and upon the circumstances such as upon the way in which the reaction mixture and the catalyst are brought together. Kriegsheim, therefore, suggested that the salts of cobalt and other metals should be reacted with a zeolite, apparently to form a compound catalyst. Whether this compound catalyst included the metal as a salt or in oxide form is unclear.

Vasilev and Mikhaylova in KINETICS OF CATALYTIC DECOMPOSITION OF SODIUM HYPOCHLORITE (Kum vuprosa za kinetikata na katalitichnoto razlagane na natriev khipokhlorit.) Godishnik na Khimiko- Tekhologicheskiya Institut, Vol. 10, No. 2, pp. 25–32, 1963, discussed the use of copper, cobalt and nickel catalysts using chloride salts of these metals. They concluded that cobalt was the most effective catalyst. However, conversion of the amount of catalyst used (1 gram-mole per liter) to ppm indicates that a huge amount of catalyst (over 56,000 ppm) was used which would, of course, be economically unattractive. The recital of the amount of other ingredients indicated that Vasilev et al were operating in a pH range of about 13.2.

SUMMARY OF THE INVENTION

After extended investigation, I have found that the problems outlined above can be substantially eliminated by catalytic decomposition of the hypochlorite into basically non-polluting products, chloride of the alkali metal or alkaline earth metal and oxygen. To do this, I employ, as catalyst a material containing one or more of the elements cobalt, nickel, copper and calcium, while operating in a pH range of 7–13. The catalyst concentration is at least 9 ppm and most advantageously is between 9–1000 ppm. Representative materials for supplying the catalyst, which appears to be converted to the oxide form in the course of the decomposition of the hypochlorite, include (1) salts (nonoxides) such as the nitrates and chlorides, for example, the hydrated form $Co(NO_3)_2 \cdot 6H_2O$ for cobalt (the most effective catalyst according to the invention), (2) the fused metal, and (3) the metal powder, although decomposition rates are generally slower for the catalyst in elemental form.

BRIEF DESCRIPTION OF THE DRAWING

The sole drawing comprises a diagrammatic outline of the process of the invention.

DESCRIPTION OF THE PREFERRED EMBODIMENTS

For a better understanding of the invention reference will now be made to the drawing which forms a part hereof.

In the drawing, chlorine-containing gas enters scrubber 10 via line 12 and is scrubbed by sodium hydroxide solution, which enters at line 14. Effluent from scrubber 10 containing sodium hydroxide, sodium carbonate and sodium hypochlorite is conducted at a pH of 8.5 via line 16 to baffled decomposition tank 18, which is maintained at a temperature of 60°C. Catalytic cobaltous nitrate hexahydrate supplied from source 20 enters the scrubber effluent via line 22. Steam enters tank 18 at line 24. During about 6 hours of residence time in decomposition tank 18, the sodium hypochlorite, with the aid of the cobalt catalyst, is broken down into oxygen, which exits at line 26 and is discharged to stack 28, and sodium chloride, which exits at line 30 in an effluent also containing sodium carbonate, the excess sodium hydroxide from the scrubbing operation and insoluble cobalt oxide (CoO).

The hypochlorite treated according to my invention is formed by scrubbing of chlorine-containing gas with a base, for example, alkali or alkaline earth metal compound such as hydroxide or carbonate. When I refer to chlorine-containing gas, I include phosgene and any other gas containing chlorine alone or combined which produces hypochlorite upon alkaline treatment. There may also be some alkali or alkaline earth metal carbonate which comes from the carbon dioxide in the chlorine-containing gas being scrubbed-in the scrubbing product containing the hypochlorite to be decomposed according to the invention. Such carbonate is usually substantially unaffected by the catalytic treatment of the hypochlorite. Thus, the principal or primary reaction taking place during the decomposition procedure employed according to my invention may be represented by the net overall equation,

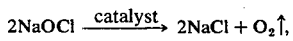

the resulting products being substantially non-polluting.

I have determined that the rate of decomposition of the hypochlorite when a cobalt catalyst is used may be calculated from the equations, $$\log r = 0.0324T + 1.3703 \log Z - 0.16699 \text{ pH} - 4.6162$$

and $$r = \log N_o - \log N_F,/t$$

wherein $r$ is the rate constant of decomposition, $T$ the temperature in degrees Centigrade (°C), $Z$ the cobalt catalyst concentration (expressed as the element) in parts per million by weight (ppm), $N_o$ the initial NaOCl concentration in grams per liter (g/l), $N_F$ the final NaOCl concentration in g/l and $t$ the time of residence in the tank in minutes. Preferred catalyst concentration is at least about 9 ppm, most advantageously between 9 and 1000 ppm. Representative materials for supplying the catalyst, which appears to be converted to the oxide form in the course of the decomposition of the hypochlorite, include salts such as the nitrates and chlorides, for example, the hydrated form $Co(NO_3)_2.6H_2O$ for cobalt (the most effective catalyst according to the invention), the fused metal and the metal powder, although decomposition rates are generally slower for the catalyst in elemental form. Thus, the use of the term "salts" as well as the terms "fused metal" and "metal powder" are intended to exclude metal oxides.

The pH may be adjusted for optimum decomposition and is preferably held at 7–13, since at a pH below 7 the hypochlorite may decompose spontaneously and release free chlorine gas, and at a pH above 13 the hypochlorite becomes stabilized, requiring unduly high amounts of catalyst. The optimum temperature range for conducting the hypochlorite decomposition according to the invention is 20°–80°C, 45°–75°C being preferred, although the solution to be treated may reach its boiling point without any adverse effect.

While the process of the invention may be conducted batchwise, I prefer to decompose the hypochlorite by passing it substantially continuously through a baffled vessel in the presence of the catalyst via a circuitous route.

The following examples are illustrative of the invention.

EXAMPLE 1

A solution containing sodium hypochlorite was prepared by scrubbing chlorine with sodium hydroxide, the solution also containing $Na_2CO_3$ from the reaction of $CO_2$ with the NaOH, and a small excess of NaOH. The pH of the solution was controlled to be between 8 and 9. The relative rates of decomposition of such solution with various cobalt-supplying catalysts are shown in Table I, using for comparison a rate of (1) for a single piece of cobalt. In the run employing the cobalt nitrate hexahydrate catalyst, a finely divided cobalt oxide (CoO) precipitated Table I

| | Relative Rates of Decomposition of NaOCl | |
|---|---|---|
| Co Additions | 27°C 600 ppm Co | 50°C 50 ppm Co |
| $Co(NO_3)_2.6H_2O$ (crystals) | 2.9 | 3.6 |
| Co Powder < 325 mesh | 2.0 | 2.0 |
| Co (single spherical piece) | 1.0 | 1.0 |

EXAMPLE 2

Waste sodium hypochlorite from alkaline scrubbing of chlorine was decomposed into NaCl and $O_2$ in a series of runs, varying the conditions of operation as they appear in the following table.

Table II

| Inlet NaOCl, g/l | Outlet NaOCl, g/l | Temp., °C | pH | Residence Time min. | Co, ppm |
|---|---|---|---|---|---|
| 3.3 | 0.08 | 43 | 7.3 | 900 | 18–21 |
| 93.4 | 0.7 | 90 | 11.6 | 450 | 9 |

Table II-continued

| Inlet NaOCl, g/l | Outlet NaOCl, g/l | Temp., °C | pH | Residence Time min. | Co, ppm |
|---|---|---|---|---|---|
| 80.0 | 2.0 | 80 | 11.6 | 500 | 12 |

EXAMPLE 3

A system for decomposing hypochlorite to chloride and oxygen similar to that of the drawing was operated continuously for several days, decomposing approximately 10 gallons per minute of an 85 g/l sodium hypochlorite solution resulting from scrubbing chlorine with sodium hydroxide.

EXAMPLE 4

The addition of 45 ppm cobalt from cobaltous nitrate hexahydrate, $[Co(NO_3)_2.6H_2O]$ to a solution coming from a scrubber in which chlorine-containing gas was scrubbed with sodium hydroxide, the solution containing 85 g/l sodium hypochlorite and being at a pH of 8.5 and a temperature of 47°C, resulted in catalytic decomposition of the hypochlorite to sodium chloride and oxygen in 6 hours. The initial hypochlorite concentration was determined by iodometric titration. The rate of sodium hypochlorite decomposition was determined by measuring gas evolution as a function of time in a water displacement apparatus. Displacement was recorded periodically from burette readings and temperature read with a thermometer suspended in the solution. The solution was stirred continuously with a magnetic stirrer. The volume of gas displaced was the difference between the initial and final burette reading, each milliliter of the burette reading being equivalent to 0.2 g NaOCl per liter. The volume of oxygen evolved was determined, assuming ideal behavior for the gas. After calculation of moles of oxygen released, the amount of sodium hypochlorite which should remain after decomposition was determined from the equation $NaOCl \rightarrow NaCl + \frac{1}{2} O_2$. This value was then subtracted from the initial hypochlorite concentration and found to be substantially the same as the comparative value obtained by iodometric titration of the final solution. The volume of collected gas also agreed quantitatively with the measured titration value. Mass spectrographic analysis showed that the collected gas formed by the catalytic decomposition of the hypochlorite was oxygen.

EXAMPLE 5

A comparison was made of the relative activities of cobalt, nickel, copper and calcium catalysts in decomposing sodium hypochlorite obtained by alkaline scrubbing of chlorine into sodium chloride and oxygen. Relative activities were found to be 115, 40, 10 and 1 respectively, using the 1 for the reference or comparison point.

EXAMPLE 6

To further compare the process of the invention to the use of compound catalysts using zeolite supports as suggested by the prior art several runs were made using, in each instance 70 ppm cobalt. A standard NaOCl solution was prepared by adding 40 grams of NaOH to 1000 cc of $H_2O$ and mixing until dissolved. $Cl_2$ was then bubbled through the solution while monitoring the pH.

The $Cl_2$ was then shut off and $N_2$ bubbled through the solution for ½ hour. The final pH reading was 10.

For run A (corresponding to the process of the invention) 0.011 grams of $Co(NO_3)_2.6H_2O$ was added to 30 cc of the above NaOCl solution at 58°C. The evolved gas ($O_2$) was measured every 5 minutes using an inverted burette until evolution stopped.

For run B, 0.046 grams of an impregnated zeolite containing 70 ppm cobalt was substituted for the cobaltous nitrate of run A. The impregnated zeolite was prepared by adding 100 grams of cobaltous nitrate $[Co(NO_3)_2.6H_2O]$ to 200 cc of $H_2O$. After the cobaltous nitrate had dissolved, 10 grams of a zeolite mixture CS-207-V (Fisher Scientific) was added and the mixture stirred for 1 hour to saturate the zeolite with the cobaltous nitrate solution. The mixture was then filtered and the impregnated zeolite was placed in an oven to dry overnight at 110°C.

From previous experimentation, it has been determined that $Co(NO_3)_2.6H_2O$, when heated to 250°F (about 120°C) converts to $Co(NO_3)_2.3H_2O$. Using this computation, 0.046 grams of the impregnated zeolite (including the tare weight of the zeolite) was calculated to provide 70 ppm cobalt as in run A. This amount of impregnated zeolite was then placed in 30 cc of the above NaOCl solution at 58°C and the evolution of gas again measured as in run A.

In run C, 0.031 grams of a zeolite impregnated as described above was used. This zeolite, however, was previously heated to 1500°F to convert the impregnated $Co(NO_3)_2.6H_2O$ to CoO. The 0.031 gram amount was calculated to provide 70 ppm cobalt as in runs A and B (including the tare weight of the zeolite).

This impregnated zeolite was added to 30 cc of the above 58°C NaCl solution and the evolution of gas again measured.

The results for runs A, B, and C are all tabulated below.

Table III

| Time in minutes | Evolved Gas in ml. | | |
|---|---|---|---|
| | Run A | Run B | Run C |
| 5 | 60 | 50 | |
| 10 | 116 | 93 | |
| 15 | 158 | 127 | |
| 20 | 188 | 150 | |
| 25 | 200 | 164 | |
| 30 | 202 | 176 | |
| 35 | 203 | 184 | |
| 40 | 204 | 186 | |
| 45 | 204* | | |
| 50 | | | |
| 55 | | | |
| 60 | | 191 | |
| 85 | | 195 | |
| 135 | | 204 | |
| 145 | | | 73 |
| 180 | | 204* | |
| 190 | | | 92 |
| 225 | | | 103 |
| 265 | | | 108 |
| 300 | | | 114 |
| 330 | | | 117 |
| 380 | | | 125 |
| 395 | | | 125* |

*Test Stopped

The results clearly indicate that there is no benefit and actually some detriment in using the compound catalyst utilizing zeolite carriers as taught in the prior art. Furthermore, as seen in run C, introduction of the cobalt initially in oxide form provides inferior results compared to the introduction of the cobalt as a salt, as that term has been defined hereinabove.

While I do not wish to be bound by any theory, it seems that possibly the introduction of the cobalt catalyst into the NaOCl solution as a salt or in elemental form results in a precipitate of cobalt oxide with enhanced catalytic properties compared to the use of cobalt already oxidized. This may be due to a more finely divided cobalt oxide being precipitated from the NaOCl solution.

In any event, it can be clearly seen that the use of an unsupported catalyst in accordance with the invention in run A resulted in complete reaction in less than 1 hour while the use of supported catalysts in salt or oxide form as in runs B and C respectively resulted in longer reaction times which—in the oxide case—was over 6 hours with incomplete reaction.

While the invention has been described in terms of preferred embodiments, the claims appended hereto are intended to encompass all embodiments which fall within the spirit of the invention.

What is claimed is:

1. A process for treating chlorine-containing gas to convert the chlorine therein to a chloride which comprises:
   a. scrubbing chlorine-containing gas with an aqueous base selected from the class consisting of an alkali metal compound or an alkaline earth metal compound to convert the chlorine therein to a hypochlorite; solution and
   b. decomposing said hypochlorite substantially continuously in the resulting solution
      1. at a pH maintained between 7–13
      2. at a temperature maintained between 20°C and the boiling point of the solution and
      3. in the presence of from about 9–1000 ppm based on weight of the hypochlorite solution of an unsupported catalyst selected from the class consisting of cobalt, nickel, copper or calcium, in the form of a salt, fused metal, or metal powder which is converted into a finely divided oxide while converting said hypochlorite into chloride while inhibiting release of free chlorine gas.

2. The improvement of claim 1 wherein the catalyst is cobalt in the form of a salt, fused metal or metal powder.

3. The improvement of claim 1 wherein the temperature during the converting of the hypochlorite is maintained at 20°C to 80°C.

4. The improvement of claim 1 wherein the converting of the hypochlorite is accomplished substantially continuously.

5. The improvement of claim 1 wherein the converting of the hypochlorite is accomplished in a baffled tank.

* * * * *